US010554496B2

(12) United States Patent
Norige et al.

(10) Patent No.: US 10,554,496 B2
(45) Date of Patent: Feb. 4, 2020

(54) HETEROGENEOUS SOC IP CORE PLACEMENT IN AN INTERCONNECT TO OPTIMIZE LATENCY AND INTERCONNECT PERFORMANCE

(71) Applicant: NetSpeed Systems, San Jose, CA (US)

(72) Inventors: Eric Norige, San Jose, CA (US); Sailesh Kumar, San Jose, CA (US)

(73) Assignee: NetSpeed Systems, San Jose, CA (US)

( * ) Notice: Subject to any disclaimer, the term of this patent is extended or adjusted under 35 U.S.C. 154(b) by 147 days.

(21) Appl. No.: 14/925,904

(22) Filed: Oct. 28, 2015

(65) Prior Publication Data

US 2017/0063634 A1    Mar. 2, 2017

Related U.S. Application Data

(63) Continuation of application No. 13/886,753, filed on May 3, 2013, now Pat. No. 9,185,023.

(51) Int. Cl.
*H04L 12/24* (2006.01)
*H04L 12/721* (2013.01)

(52) U.S. Cl.
CPC ............ *H04L 41/12* (2013.01); *H04L 41/147* (2013.01); *H04L 45/06* (2013.01)

(58) Field of Classification Search
None
See application file for complete search history.

(56) References Cited

U.S. PATENT DOCUMENTS

| 5,432,785 | A | | 7/1995 | Ahmed et al. |
| 5,764,740 | A | | 6/1998 | Holender |
| 5,974,245 | A | * | 10/1999 | Li ....................... G06F 17/5077 716/104 |
| 5,991,308 | A | | 11/1999 | Fuhrmann et al. |

(Continued)

FOREIGN PATENT DOCUMENTS

| CN | 103684961 A | 3/2014 |
| WO | 2014059024 A1 | 4/2014 |

OTHER PUBLICATIONS

Abts, D., et al., Age-Based Packet Arbitration in Large-Radix k-ary n-cubes, Supercomputing 2007 (SC07), Nov. 10-16, 2007, 11 pgs.

(Continued)

*Primary Examiner* — Hong S Cho
(74) *Attorney, Agent, or Firm* — Spectrum IP Law Group LLC

(57) ABSTRACT

Systems and methods described herein are directed to solutions for Network on Chip (NoC) interconnects that automatically and dynamically determines the position of hosts of various size and shape in a NoC topology based on the connectivity, bandwidth and latency requirements of the system traffic flows and certain performance optimization metrics such as system interconnect latency and interconnect cost. The example embodiments selects hosts for relocation consideration and determines a new possible position for them in the NoC based on the system traffic specification, shape and size of the hosts and by using probabilistic function to decide if the relocation is carried out or not. The procedure is repeated over new sets of hosts until certain optimization targets are satisfied or repetition count is exceeded.

15 Claims, 17 Drawing Sheets

(56) References Cited

U.S. PATENT DOCUMENTS

| | | | |
|---|---|---|---|
| 6,003,029 | A | 12/1999 | Agrawal et al. |
| 6,249,902 | B1 | 6/2001 | Igusa et al. |
| 6,415,282 | B1 | 7/2002 | Mukherjea et al. |
| 6,925,627 | B1 | 8/2005 | Longway et al. |
| 7,065,730 | B2 | 6/2006 | Alpert et al. |
| 7,318,214 | B1 | 1/2008 | Prasad et al. |
| 7,590,959 | B2 | 9/2009 | Tanaka |
| 7,701,252 | B1 | 4/2010 | Chow et al. |
| 7,725,859 | B1 | 5/2010 | Lenahan et al. |
| 7,808,968 | B1 | 10/2010 | Kalmanek, Jr. et al. |
| 7,917,885 | B2 | 3/2011 | Becker |
| 8,018,249 | B2 | 9/2011 | Koch et al. |
| 8,050,256 | B1 | 11/2011 | Bao et al. |
| 8,059,551 | B2 | 11/2011 | Milliken |
| 8,099,757 | B2 | 1/2012 | Riedle et al. |
| 8,136,071 | B2 | 3/2012 | Solomon |
| 8,281,297 | B2 | 10/2012 | Dasu et al. |
| 8,312,402 | B1 | 11/2012 | Okhmatovski et al. |
| 8,438,578 | B2 | 5/2013 | Hoover et al. |
| 8,448,102 | B2 | 5/2013 | Kornachuk et al. |
| 8,492,886 | B2 | 7/2013 | Or-Bach et al. |
| 8,541,819 | B1 | 9/2013 | Or-Bach et al. |
| 8,543,964 | B2 | 9/2013 | Ge et al. |
| 8,601,423 | B1 | 12/2013 | Philip et al. |
| 8,635,577 | B2 | 1/2014 | Kazda et al. |
| 8,667,439 | B1 | 3/2014 | Kumar et al. |
| 8,717,875 | B2 | 5/2014 | Bejerano et al. |
| 8,726,295 | B2 | 5/2014 | Hoover et al. |
| 8,819,611 | B2 | 8/2014 | Philip et al. |
| 2002/0071392 | A1 | 6/2002 | Grover et al. |
| 2002/0073380 | A1 | 6/2002 | Cooke et al. |
| 2002/0095430 | A1 | 7/2002 | Egilsson et al. |
| 2004/0103218 | A1 | 5/2004 | Blumrich et al. |
| 2004/0216072 | A1 | 10/2004 | Alpert et al. |
| 2005/0147081 | A1 | 7/2005 | Acharya et al. |
| 2005/0203988 | A1* | 9/2005 | Nollet .............. G06F 15/7825 709/201 |
| 2006/0161875 | A1 | 7/2006 | Rhee |
| 2007/0118320 | A1 | 5/2007 | Luo et al. |
| 2007/0244676 | A1 | 10/2007 | Shang et al. |
| 2007/0256044 | A1 | 11/2007 | Coryer et al. |
| 2007/0267680 | A1 | 11/2007 | Uchino et al. |
| 2008/0072182 | A1 | 3/2008 | He et al. |
| 2008/0120129 | A1 | 5/2008 | Seubert et al. |
| 2009/0070726 | A1 | 3/2009 | Mehrotra et al. |
| 2009/0187756 | A1 | 7/2009 | Nollet et al. |
| 2009/0268677 | A1 | 10/2009 | Chou et al. |
| 2009/0285222 | A1* | 11/2009 | Hoover .............. H04L 45/06 370/397 |
| 2009/0307714 | A1 | 12/2009 | Hoover et al. |
| 2009/0313592 | A1 | 12/2009 | Murali et al. |
| 2010/0040162 | A1 | 2/2010 | Suehiro |
| 2011/0035523 | A1 | 2/2011 | Feero et al. |
| 2011/0060831 | A1 | 3/2011 | Ishii et al. |
| 2011/0072407 | A1 | 3/2011 | Keinert et al. |
| 2011/0154282 | A1 | 6/2011 | Chang et al. |
| 2011/0276937 | A1 | 11/2011 | Waller |
| 2012/0022841 | A1 | 1/2012 | Appleyard |
| 2012/0023473 | A1 | 1/2012 | Brown et al. |
| 2012/0026917 | A1 | 2/2012 | Guo et al. |
| 2012/0110541 | A1 | 5/2012 | Ge et al. |
| 2012/0155250 | A1 | 6/2012 | Carney et al. |
| 2013/0051397 | A1 | 2/2013 | Guo et al. |
| 2013/0080073 | A1 | 3/2013 | de Corral |
| 2013/0103369 | A1 | 4/2013 | Huynh et al. |
| 2013/0151215 | A1 | 6/2013 | Mustapha |
| 2013/0159944 | A1 | 6/2013 | Uno et al. |
| 2013/0174111 | A1* | 7/2013 | Durkan .............. G06F 17/5081 716/112 |
| 2013/0174113 | A1* | 7/2013 | Lecler .............. G06F 17/5072 716/122 |
| 2013/0179902 | A1 | 7/2013 | Hoover et al. |
| 2013/0207801 | A1 | 8/2013 | Barnes |
| 2013/0219148 | A1 | 8/2013 | Chen et al. |
| 2013/0263068 | A1 | 10/2013 | Cho et al. |
| 2013/0326458 | A1 | 12/2013 | Kazda et al. |
| 2014/0068132 | A1 | 3/2014 | Philip et al. |
| 2014/0092740 | A1 | 4/2014 | Wang et al. |
| 2014/0098683 | A1 | 4/2014 | Kumar et al. |
| 2014/0115218 | A1 | 4/2014 | Philip et al. |
| 2014/0115298 | A1 | 4/2014 | Philip et al. |
| 2015/0043575 | A1 | 2/2015 | Kumar et al. |
| 2015/0109024 | A1 | 4/2015 | Abdelfattah et al. |
| 2015/0159330 | A1 | 6/2015 | Weisman et al. |

OTHER PUBLICATIONS

Das, R., et al., Aergia: Exploiting Packet Latency Slack in On-Chip Networks, 37th International Symposium on Computer Architecture (ISCA '10), Jun. 19-23, 2010, 11 pgs.

Ebrahimi, E., et al., Fairness via Source Throttling: A Configurable and High-Performance Fairness Substrate for Multi-Core Memory Systems, ASPLOS '10, Mar. 13-17, 2010, 12 pgs.

Grot, B., Preemptive Virtual Clock: A Flexible, Efficient, and Cost-Effective QOS Scheme for Networks-on-Chip, Micro '09, Dec. 12-16, 2009, 12 pgs.

Grot, B., Kilo-NOC: A Heterogeneous Network-on-Chip Architecture for Scalability and Service Guarantees, ISCA '11, Jun. 4-8, 2011, 12 pgs.

Grot, B., Topology-Aware Quality-of-Service Support in Highly Integrated Chip Multiprocessors, 6th Annual Workshop on the Interaction between Operating Systems and Computer Architecture, Jun. 2006, 11 pgs.

Jiang, N., et al., Performance Implications of Age-Based Allocations in On-Chip Networks, CVA MEMO 129, May 24, 2011, 21 pgs.

Lee, J. W., et al., Globally-Synchronized Frames for Guaranteed Quality-of-Service in On-Chip Networks, 35th IEEE/ACM International Symposium on Computer Architecture (ISCA), Jun. 2008, 12 pgs.

Lee, M. M., et al., Approximating Age-Based Arbitration in On-Chip Networks, PACT '10, Sep. 11-15, 2010, 2 pgs.

Li, B. et al., CoQoS: Coordinating QoS-Aware Shared Resources in NoC-based SoCs, J. Parallel Distrib. Comput., 71(5), May 2011, 14 pgs.

International Search Report and Written Opinion for PCT/US2013/064140, dated Jan. 22, 2014, 9 pgs.

International Search Report and Written Opinion for PCT/US2014/012003, dated Mar. 26, 2014, 9 pgs.

International Search Report and Written Opinion for PCT/US2014/012012, dated May 14, 2014, 9 pgs.

Ababei, C., et al., Achieving Network on Chip Fault Tolerance by Adaptive Remapping, Parallel & Distributed Processing, 2009, IEEE International Symposium, 4 pgs.

Beretta, I, et al., A Mapping Flow for Dynamically Reconfigurable Multi-Core System-on-Chip Design, IEEE Transactions on Computer-Aided Design of Integrated Circuits and Systems, Aug. 2011, 30(8), pp. 1211-1224.

Gindin, R., et al., NoC-Based FPGA: Architecture and Routing, Proceedings of the First International Symposium on Networks-on-Chip (NOCS'07), May 2007, pp. 253-262.

Yang, J., et al., Homogeneous NoC-based FPGA: The Foundation for Virtual FPGA, 10th IEEE International Conference on Computer and Information Technology (CIT 2010), Jun. 2010, pp. 62-67.

* cited by examiner

HETEROGENEOUS SOC IP CORE PLACEMENT IN AN INTERCONNECT TO OPTIMIZE LATENCY AND INTERCONNECT PERFORMANCE

This application claims benefit under 35 USC 120 and is a Continuation of U.S. patent application Ser. No. 13/886,753, filed on May 3, 2013, issued as U.S. Pat. No. 9,185,023, to be granted on Nov. 10, 2015, the content of which is incorporated herein in its entirety by reference.

BACKGROUND

Technical Field

Methods and example implementations described herein are directed to interconnect architecture, and more specifically, to automatically optimize the placement of heterogeneous SoC IP cores within a Network on Chip (NoC) interconnect architecture.

Related Art

The number of components on a chip is rapidly growing due to increasing levels of integration, system complexity and shrinking transistor geometry. Complex System-on-Chips (SoCs) may involve a variety of components e.g., processor cores, DSPs, hardware accelerators, memory and I/O, while Chip Multi-Processors (CMPs) may involve a large number of homogenous processor cores, memory and I/O subsystems. In both SoC and CMP systems, the on-chip interconnect plays a role in providing high-performance communication between the various components. Due to scalability limitations of traditional buses and crossbar based interconnects, Network-on-Chip (NoC) has emerged as a paradigm to interconnect a large number of components on the chip. NoC is a global shared communication infrastructure made up of several routing nodes interconnected with each other using point-to-point physical links.

Messages are injected by the source and are routed from the source node to the destination over multiple intermediate nodes and physical links. The destination node then ejects the message and provides the message to the destination. For the remainder of this application, the terms 'components', 'blocks', 'hosts' or 'cores' will be used interchangeably to refer to the various system components which are interconnected using a NoC. Terms 'routers' and 'nodes' will also be used interchangeably. Without loss of generalization, the system with multiple interconnected components will itself be referred to as a 'multi-core system'.

There are several topologies in which the routers can connect to one another to create the system network. Bi-directional rings (as shown in FIG. 1(a)), 2-D (two dimensional) mesh (as shown in FIG. 1(b)) and 2-D Taurus (as shown in FIG. 1(c)) are examples of topologies in the related art. Mesh and Taurus can also be extended to 2.5-D (two and half dimensional) or 3-D (three dimensional) organizations. FIG. 1(d) shows a 3D mesh NoC, where there are three layers of 3×3 2D mesh NoC shown over each other. The NoC routers have up to two additional ports, one connecting to a router in the higher layer, and another connecting to a router in the lower layer. Router 111 in the middle layer of the example has both ports used, one connecting to the router at the top layer and another connecting to the router at the bottom layer. Routers 110 and 112 are at the bottom and top mesh layers respectively, therefore they have only the upper facing port 113 and the lower facing port 114 respectively connected.

Packets are message transport units for intercommunication between various components. Routing involves identifying a path composed of a set of routers and physical links of the network over which packets are sent from a source to a destination. Components are connected to one or multiple ports of one or multiple routers; with each such port having a unique ID. Packets carry the destination's router and port ID for use by the intermediate routers to route the packet to the destination component.

Examples of routing techniques include deterministic routing, which involves choosing the same path from A to B for every packet. This form of routing is independent from the state of the network and does not load balance across path diversities, which might exist in the underlying network. However, such deterministic routing may implemented in hardware, maintains packet ordering and may be rendered free of network level deadlocks. Shortest path routing may minimize the latency as such routing reduces the number of hops from the source to the destination. For this reason, the shortest path may also be the lowest power path for communication between the two components. Dimension-order routing is a form of deterministic shortest path routing in 2-D, 2.5-D, and 3-D mesh networks. In this routing scheme, messages are routed along each coordinates in a particular sequence until the message reaches the final destination. For example in a 3-D mesh network, one may first route along the X dimension until it reaches a router whose X-coordinate is equal to the X-coordinate of the destination router. Next, the message takes a turn and is routed in along Y dimension and finally takes another turn and moves along the Z dimension until the message reaches the final destination router. Dimension ordered routing may be minimal turn and shortest path routing.

FIG. 2(a) pictorially illustrates an example of XY routing in a two dimensional mesh. More specifically, FIG. 2(a) illustrates XY routing from node '34' to node '00'. In the example of FIG. 2(a), each component is connected to only one port of one router. A packet is first routed over the x-axis till the packet reaches node '04' where the x-coordinate of the node is the same as the x-coordinate of the destination node. The packet is next routed over the y-axis until the packet reaches the destination node.

In heterogeneous mesh topology in which one or more routers or one or more links are absent, dimension order routing may not be feasible between certain source and destination nodes, and alternative paths may have to be taken. The alternative paths may not be shortest or minimum turn.

Source routing and routing using tables are other routing options used in NoC. Adaptive routing can dynamically change the path taken between two points on the network based on the state of the network. This form of routing may be complex to analyze and implement.

A NoC interconnect may contain multiple physical networks. Over each physical network, there may exist multiple virtual networks, wherein different message types are transmitted over different virtual networks. In this case, at each physical link or channel, there are multiple virtual channels; each virtual channel may have dedicated buffers at both end points. In any given clock cycle, only one virtual channel can transmit data on the physical channel.

NoC interconnects may employ wormhole routing, wherein, a large message or packet is broken into small pieces known as flits (also referred to as flow control digits).

The first flit is the header flit, which holds information about this packet's route and key message level info along with payload data and sets up the routing behavior for all subsequent flits associated with the message. Optionally, one or more body flits follows the head flit, containing the remaining payload of data. The final flit is the tail flit, which in addition to containing the last payload also performs some bookkeeping to close the connection for the message. In wormhole flow control, virtual channels are often implemented.

The physical channels are time sliced into a number of independent logical channels called virtual channels (VCs). VCs provide multiple independent paths to route packets, however they are time-multiplexed on the physical channels. A virtual channel holds the state needed to coordinate the handling of the flits of a packet over a channel. At a minimum, this state identifies the output channel of the current node for the next hop of the route and the state of the virtual channel (idle, waiting for resources, or active). The virtual channel may also include pointers to the flits of the packet that are buffered on the current node and the number of flit buffers available on the next node.

The term "wormhole" plays on the way messages are transmitted over the channels: the output port at the next router can be so short that received data can be translated in the head flit before the full message arrives. This allows the router to quickly set up the route upon arrival of the head flit and then opt out from the rest of the conversation. Since a message is transmitted flit by flit, the message may occupy several flit buffers along its path at different routers, creating a worm-like image.

Based upon the traffic between various end points, and the routes and physical networks that are used for various messages, different physical channels of the NoC interconnect may experience different levels of load and congestion. The capacity of various physical channels of a NoC interconnect is determined by the width of the channel (number of physical wires) and the clock frequency at which it is operating. Various channels of the NoC may operate at different clock frequencies, and various channels may have different widths based on the bandwidth requirement at the channel. The bandwidth requirement at a channel is determined by the flows that traverse over the channel and their bandwidth values. Flows traversing over various NoC channels are affected by the routes taken by various flows. In a mesh or Taurus NoC, there may exist multiple route paths of equal length or number of hops between any pair of source and destination nodes. For example, in FIG. 2(b), in addition to the standard XY route between nodes 34 and 00, there are additional routes available, such as YX route 203 or a multi-turn route 202 that makes more than one turn from source to destination.

In a NoC with statically allocated routes for various traffic slows, the load at various channels may be controlled by intelligently selecting the routes for various flows. When a large number of traffic flows and substantial path diversity is present, routes can be chosen such that the load on all NoC channels is balanced nearly uniformly, thus avoiding a single point of bottleneck. Once routed, the NoC channel widths can be determined based on the bandwidth demands of flows on the channels. Unfortunately, channel widths cannot be arbitrarily large due to physical hardware design restrictions, such as timing or wiring congestion. There may be a limit on the maximum channel width, thereby putting a limit on the maximum bandwidth of any single NoC channel.

Additionally, wider physical channels may not help in achieving higher bandwidth if messages are short. For example, if a packet is a single flit packet with a 64-bit width, then no matter how wide a channel is, the channel will only be able to carry 64 bits per cycle of data if all packets over the channel are similar. Thus, a channel width is also limited by the message size in the NoC. Due to these limitations on the maximum NoC channel width, a channel may not have enough bandwidth in spite of balancing the routes.

To address the above bandwidth concern, multiple parallel physical NoCs may be used. Each NoC may be called a layer, thus creating a multi-layer NoC architecture. Hosts inject a message on a NoC layer; the message is then routed to the destination on the NoC layer, where it is delivered from the NoC layer to the host. Thus, each layer operates more or less independently from each other, and interactions between layers may only occur during the injection and ejection times. FIG. 3(a) illustrates a two layer NoC. Here the two NoC layers are shown adjacent to each other on the left and right, with the hosts connected to the NoC replicated in both left and right diagrams. A host is connected to two routers in this example—a router in the first layer shown as R1, and a router is the second layer shown as R2. In this example, the multi-layer NoC is different from the 3D NoC, i.e. multiple layers are on a single silicon die and are used to meet the high bandwidth demands of the communication between hosts on the same silicon die. Messages do not go from one layer to another. For purposes of clarity, the present application will utilize such a horizontal left and right illustration for multi-layer NoC to differentiate from the 3D NoCs, which are illustrated by drawing the NoCs vertically over each other.

In FIG. 3(b), a host connected to a router from each layer, R1 and R2 respectively, is illustrated. Each router is connected to other routers in its layer using directional ports 301, and is connected to the host using injection and ejection ports 302. A bridge-logic 303 may sit between the host and the two NoC layers to determine the NoC layer for an outgoing message and sends the message from host to the NoC layer, and also perform the arbitration and multiplexing between incoming messages from the two NoC layers and delivers them to the host.

In a multi-layer NoC, the number of layers needed may depend upon a number of factors such as the aggregate bandwidth requirement of all traffic flows in the system, the routes that are used by various flows, message size distribution, maximum channel width, etc. Once the number of NoC layers in NoC interconnect is determined in a design, different messages and traffic flows may be routed over different NoC layers. Additionally, one may design NoC interconnects such that different layers have different topologies in number of routers, channels and connectivity. The channels in different layers may have different widths based on the flows that traverse over the channel and their bandwidth requirements.

In a NoC interconnect if the traffic profile is not uniform and there is certain amount of heterogeneity (e.g., certain hosts talk to each other more frequently than the others), the interconnect performance may depend a lot on the NoC topology and where various hosts are placed in the topology with respect to each other and to what routers they are connected to. For example if two hosts talk to each other frequently and need higher bandwidth, then they should be placed next to each other. This will reduce the latency for this communication, and thereby reduce the global average latency, as well as reduce the number of router nodes and links over which the high bandwidth of this communication must be provisioned. Moving two hosts close by may make certain other hosts far apart since all hosts must fit into the 2D planar NoC topology without overlapping with each other. Thus, right tradeoffs must be made and the hosts must be placed after examining the pair-wise bandwidth and latency requirements between all hosts so that certain global cost and performance metrics is optimized. The cost and performance metrics can include the average structural latency between all communicating hosts in number of router hops, or the sum of the bandwidth between all pair of hosts and the distance between them in number of hops, or some combination thereof. This optimization problem is known to be non-deterministic polynomial-time hard (NP-hard) and heuristic based approaches are often used. The hosts in a system may vary is shape and sizes with respect to each other which puts additional complexity in placing them in a 2D planar NoC topology, packing them optimally leaving little whitespaces, and avoiding overlapping hosts.

SUMMARY

Aspects of the present application include a method, which may involve automatically determining positions for various hosts or IP cores of different shapes and sizes in a mesh or Taurus network on chip (NoC) interconnect and connecting the host's ports to various NoC routers so that the overall system performance in form of certain efficiency functions is optimized; determining efficiency function in terms of latency, bandwidth and distance in number of router hops between all communicating hosts in the NoC; ensuring that the resulting positions of hosts does not result in two hosts spatially overlapping with each other and minimizes the whitespace between hosts of different shapes and sizes; ensuring that all host's ports can be connected to the available NoC routers; ensuring that the resulting positions of the hosts does not affect the connectivity needed by all hosts in the NoC; and automatically configuring the NoC routers and paths based on the host positions.

Aspects of the present application include a system, which may involve automatically determining positions for various hosts or IP cores of different shapes and sizes in a mesh or Taurus network on chip (NoC) interconnect and connecting the host's ports to various NoC routers so that the overall system performance in form of certain efficiency functions is optimized; determining efficiency function in terms of latency, bandwidth and distance in number of router hops between all communicating hosts in the NoC; ensuring that the resulting positions of hosts does not result in two hosts spatially overlapping with each other and minimizes the whitespace between hosts of different shapes and sizes; ensuring that all host's ports can be connected to the available NoC routers; ensuring that the resulting positions of the hosts does not affect the connectivity needed by all hosts in the NoC; and automatically configuring the NoC routers and paths based on the host positions.

DETAILED DESCRIPTION

Figure 1A:
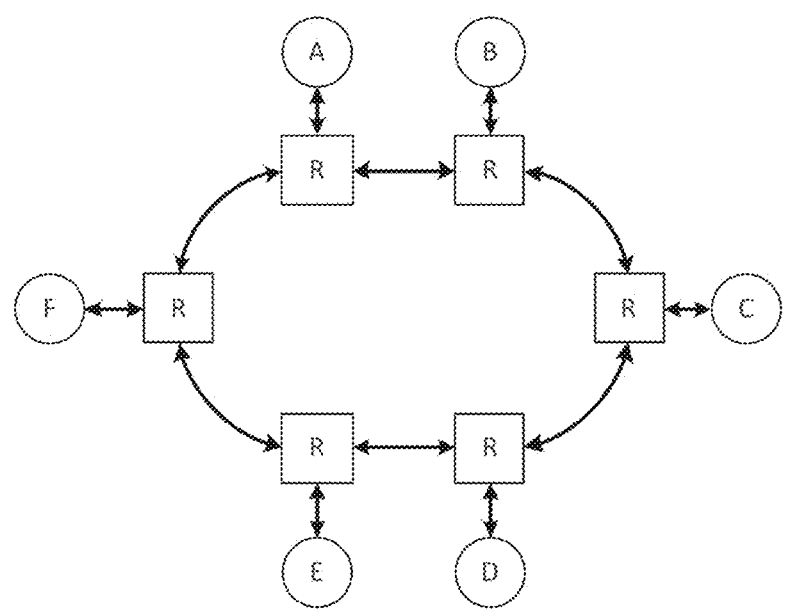
FIGS. 1(a), 1(b) 1(c) and 1(d) illustrate examples of Bidirectional ring, 2D Mesh, 2D Taurus, and 3D Mesh NoC Topologies.
Figure 1B:
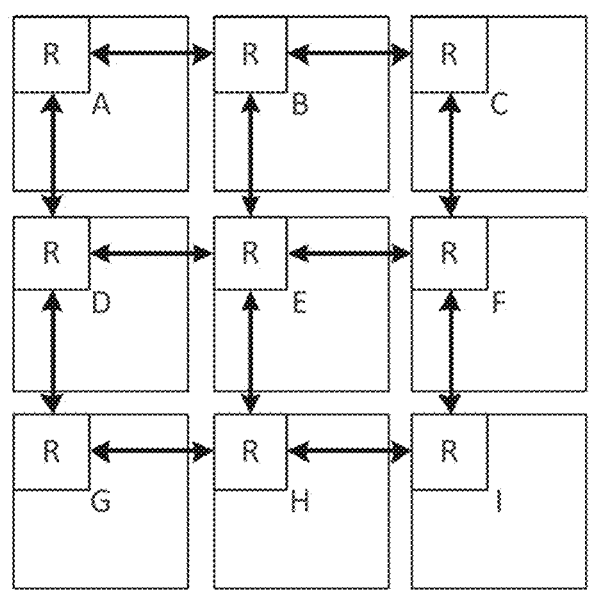
Figure 1C:
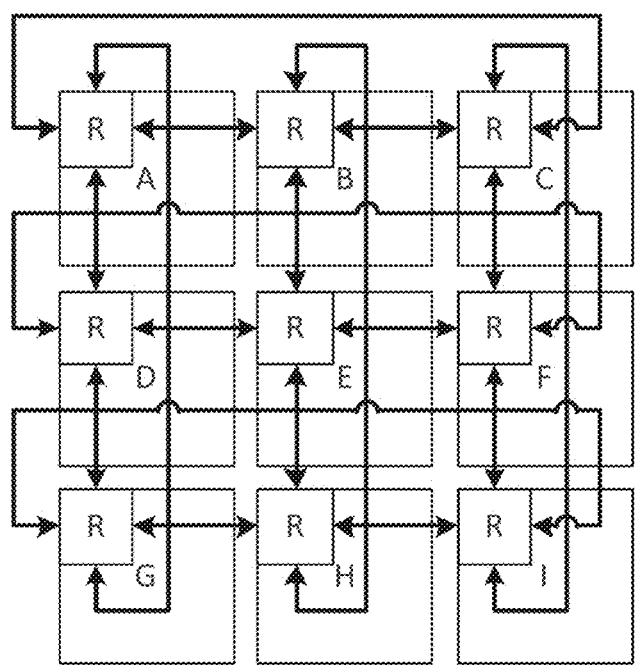
Figure 1D:
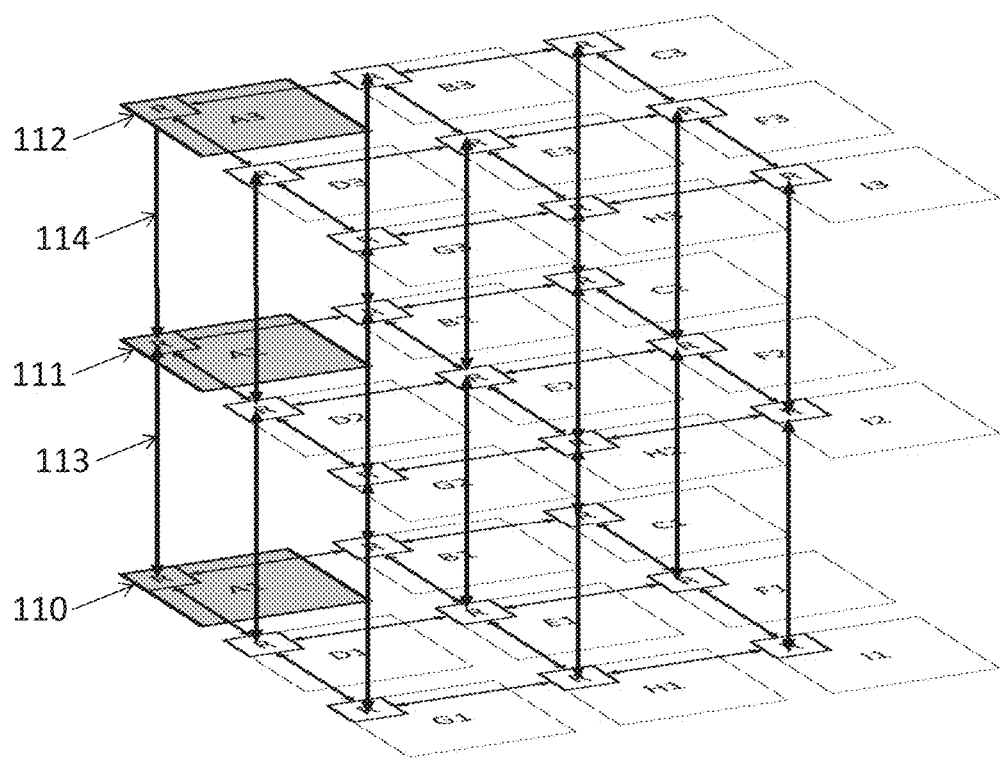
Figure 2A:
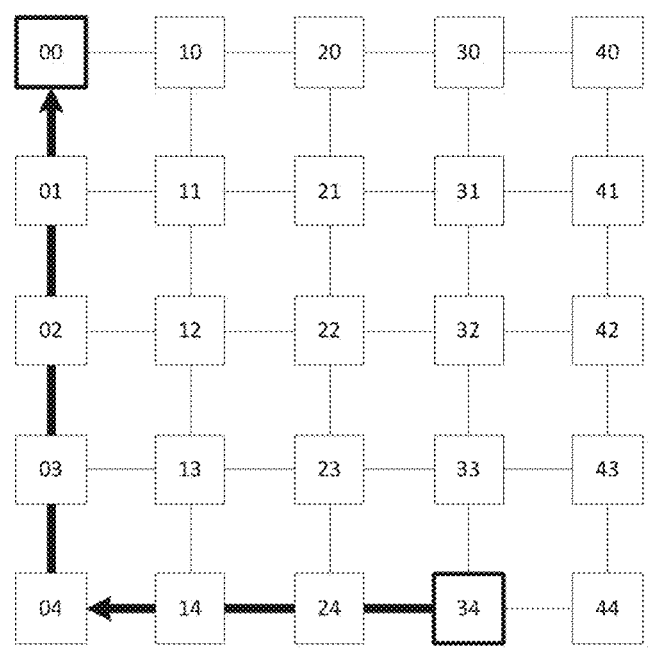
FIG. 2(a) illustrates an example of XY routing in a related art two dimensional mesh.
Figure 2B:
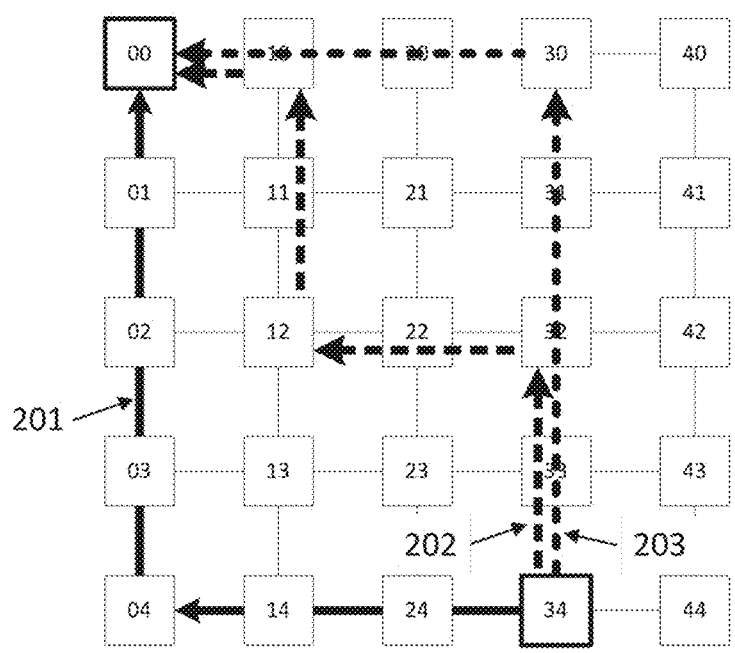
FIG. 2(b) illustrates three different routes between a source and destination nodes.
Figure 3A:
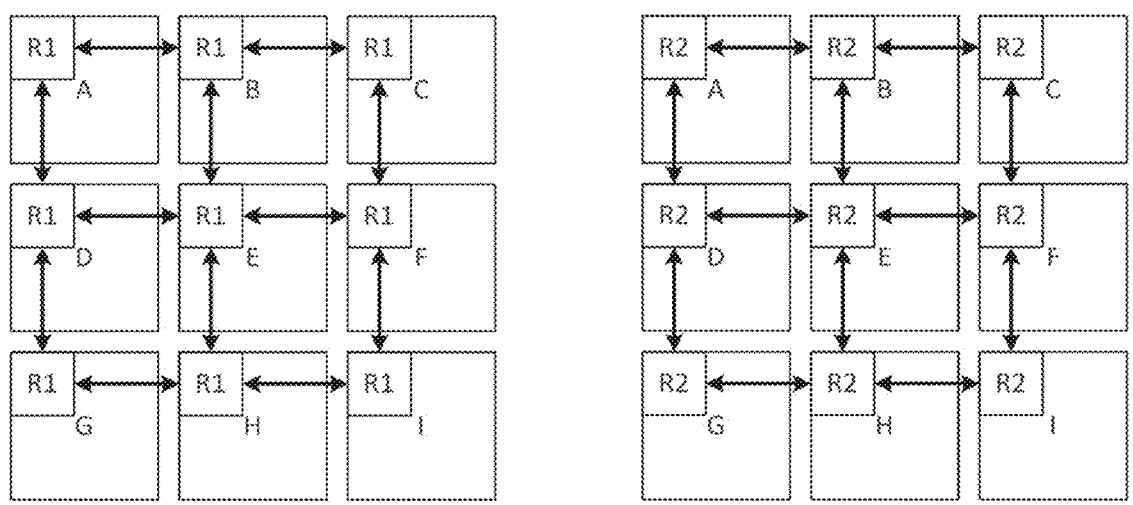
FIG. 3(a) illustrates an example of a related art two layer NoC interconnect.
Figure 3B:
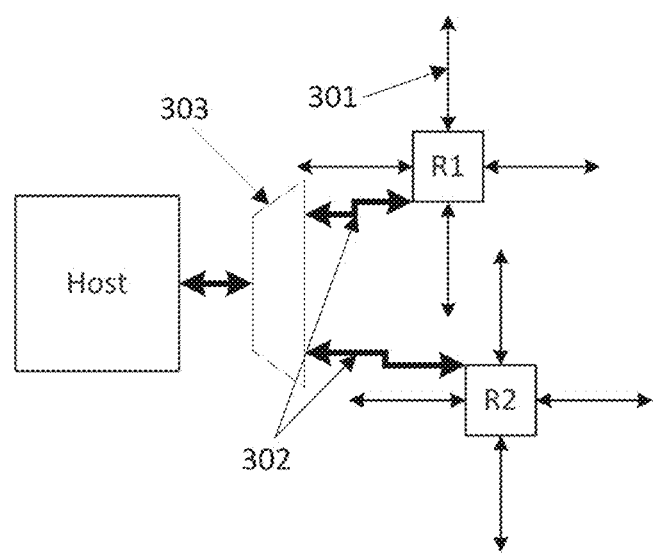
FIG. 3(b) illustrates the related art bridge logic between host and multiple NoC layers.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application.

In a distributed NoC interconnect connecting various components of a system on a chip with each other using multiple routers and point to point links between the routers, there may be a need to determine an appropriate position for various hosts in the NoC topology and connect them to the local router at the position. For example, if two hosts communicate with each other frequently and need high bandwidth, it may be better to place them closer to each other so that the transactions between these hosts go over fewer router hops and links and the overall latency and the NoC cost can be reduced. Assuming that two hosts with certain shapes and sizes cannot spatially overlap with each other on a 2D SoC plane, there is a tradeoff Moving certain hosts closer, benefitting inter-communication between them, may force certain other hosts to be further apart, penalizing inter-communication between the other hosts. In order to make the right tradeoff that improves system performance, an objective function may be defined in terms of various system performance metrics and used as an objective function to optimize host placement. Determining near-optimal host positions that maximize the objective function may involve analyzing the connectivity and inter-communication properties between all hosts and judiciously placing them onto the 2D NoC topology.

Figure 4A:
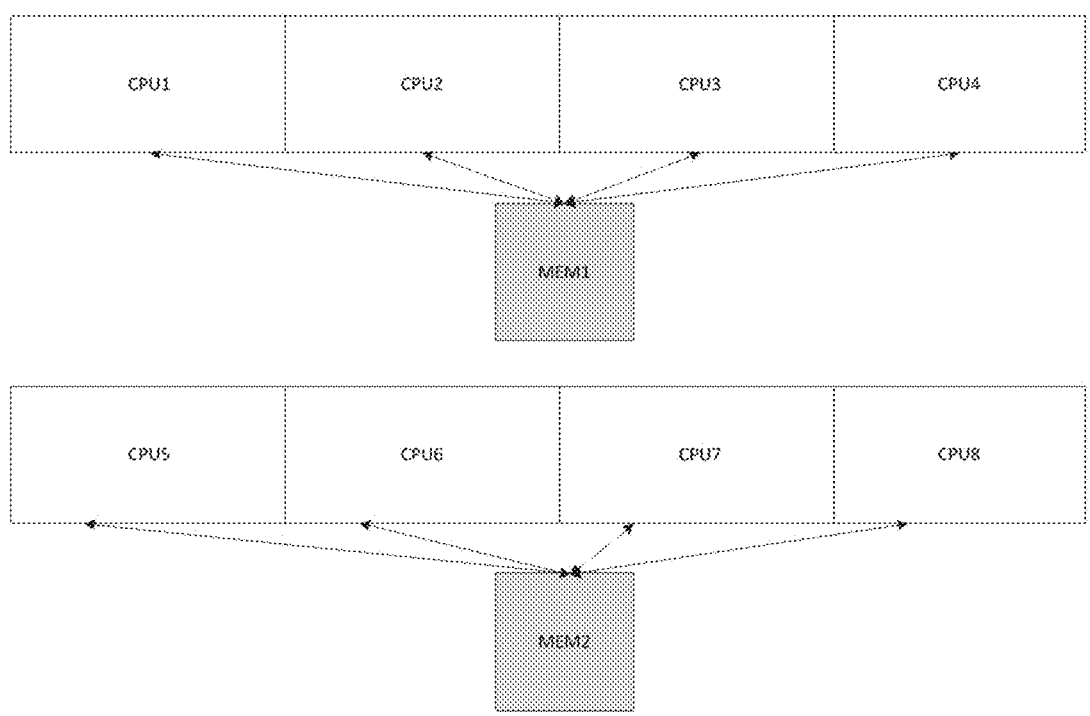
FIG. 4(a) illustrates number of system components and the connectivity between them.
Figure 4B:
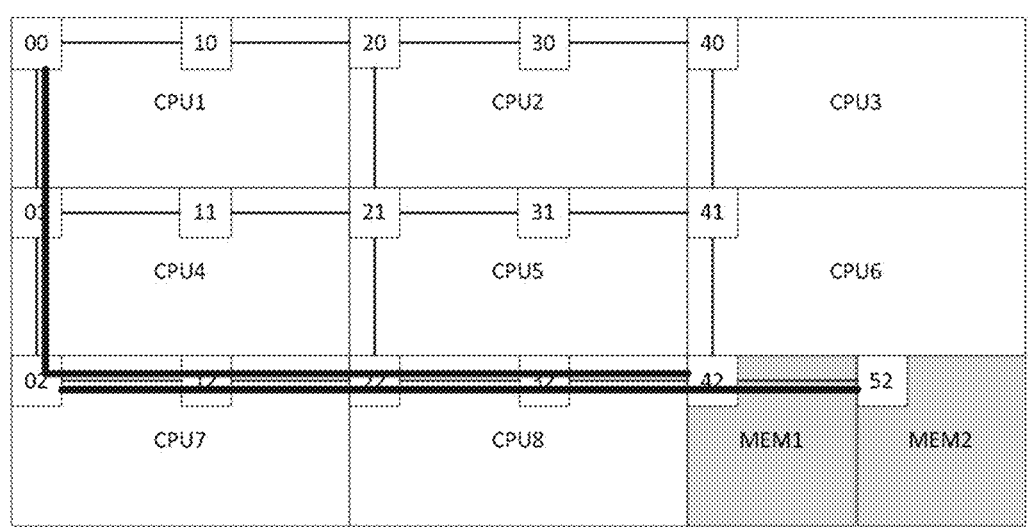
FIG. 4(b) illustrates a sample position of various hosts in a 3×6 mesh NoC topology.

For example, the network may consist of eight Central Processing Unit (CPU) clusters (each cluster containing two CPUs in a left-right orientation resulting in a rectangular shape cluster of size 2×1) and two small memories of size 1×1. The first four CPU clusters may need to communicate with the first memory and the second four CPU clusters may need to communicate with the second memory. FIG. 4(a) shows the communication pattern among the hosts. It also shows the relative size and orientation of the CPU clusters and memory. FIG. 4(b) shows one way to organize these hosts in a 3×6 mesh interconnect topology that is designed considering the asymmetric shape and size of the CPU and memory blocks. In this organization, each host occupies one or two adjacent cells in the mesh and is directly connected to the router in the top left corner of this area, such routers are router 00, 20, 40, 01, 21, 41, 02, 22, 42 and 52. The remaining routers are intermediate NoC routers, which are not connected to any host port but provide the needed connectivity between the NoC routers. Because this placement of hosts does not take into account the communication patterns, hosts that communicate with each other are often placed far away from each other, resulting in high communication latencies. For example, any message sent by CPU1 to MEM1 has to go through seven router hops, and from CPU7 to MEM2 goes through six router hops.

Figure 4C:
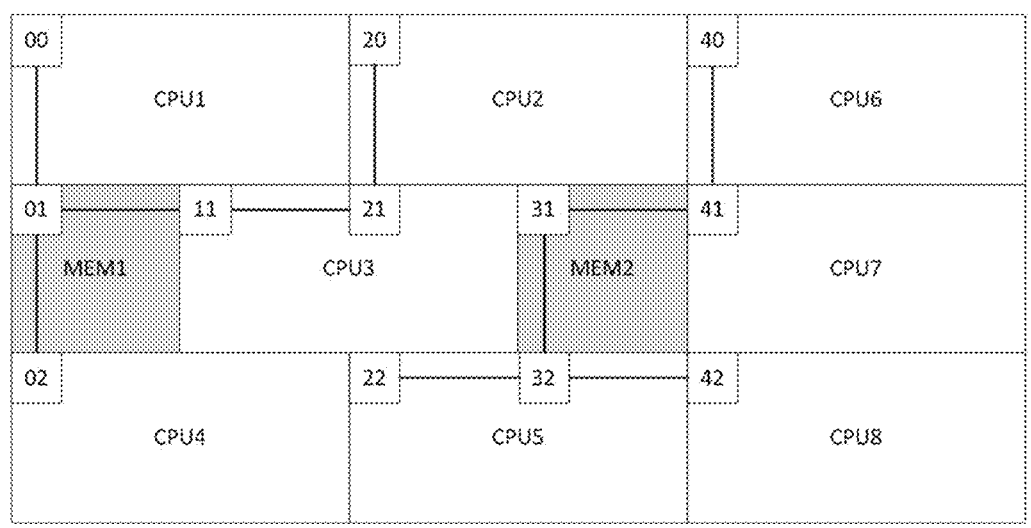
FIG. 4(c) illustrates a better position of various hosts in a 3×6 mesh NoC topology, in accordance with an example implementation.

One may place the above set of hosts in an organization shown in FIG. 4(c). The resulting NoC interconnect as shown in the figure will significantly reduce the average and peak structural latency values. The maximum structural latency in this organization between inter-communicating hosts is four router hops, and a large fraction of inter-communicating hosts are only two router hops apart. The host positions in FIG. 4(c) can be achieved from FIG. 4(b) by making small adjustments to the position of the hosts, incrementally improving the objective function, until the shown configuration is reached. This example lends itself to approaches to position optimization, but complex, asymmetric bandwidth and latency restrictions can combine with the heterogeneously shaped hosts to make it difficult to identify an optimal configuration. Even restricted instances of this task can be reduced to a known NP-hard problem, so the example implementations described herein utilize heuristic approaches to identify optimal solutions. The example implementations are directed to a number of optimization heuristic algorithms to place various hosts in a NoC topology to optimize an objective function that reflects the desired system performance metrics.

The overall structure of a process to optimize the position of various hosts in a NoC interconnect in this manner is described in U.S. patent application Ser. No. 13/779,618, herein incorporated by reference in its entirety for all purposes, which is directed to the process of making a change of the position, computing the objective function and either accepting or reverting this change and trying another position change. Example implementations described herein are directed to specialized processes to change the positions of the hosts, in case the hosts are of different sizes and shapes, and map span multiple grid cells of the mesh topology.

When considering two hosts of identical size, one possible modification to their positions is to swap the two. For hosts of different sizes, this operation may be implemented by identifying the "footprint" of the larger host and then identifying a collection of hosts adjacent to the other host that match the size of the footprint. The hosts in all these positions are swapped with the large host. Consider a system components and the interconnect shown in FIG. 5(a). In this system consider swapping CPU6 with CPU1. The footprint of CPU6 covers the aggregate footprint of hosts CPU0, CPU1, MEM1 and CPU3 exactly. Thus, CPU6 can be swapped with all of these at once as a single operation.

This swap-based position change in which a large host is swapped with multiple smaller hosts with an equal physical footprint may be inefficient in many situations. For example, there may be no way to use such swapping to transform the network shown in FIG. 4(b) into the network shown in FIG. 4(c), as such swapping cannot be used to separate the two memories so they are no longer adjacent to each other. This limitation of footprint based swapping solution thereby requires alternate position-altering methods, which are addressed by the example implementations.

A placement optimization system may have a variety of position altering methods, and must choose one to use at each step. If the system uses a fixed sequence of position altering methods, some placements of hosts to cores may be reachable from the starting configuration. To overcome this limitation, example implementations involve a random function, f1, to decide which position altering method to apply. In one example implementation, a function that gives equal chance to each position alteration method can be employed. In another example implementation, a function with fixed weights for each position altering method can be employed. For example, for three position altering methods A, B, and C, the function may have weights 0.2, 0.3 and 0.5 respectively. This means that method C will be used about half the time, and A about one in five tries.

In example implementations, an adaptive probability function that uses the information about whether or not a position altering method was able to succeed at improving the objective function can also be utilized. This allows example implementations to favor methods that are more likely to give improved results for the specific collection of hosts and traffic characteristics being optimized. If the number of successes for each method are counted, the counts can be used to assign probabilities to each method, defining f1 as follows:

$$P(result_i) = \frac{(1 + improvements_i)}{\sum_1 (1 + improvements_j)}$$

Here P(result_i) indicates the probability of choosing a particular result, that is, the probability of choosing a certain position altering method. The variable improvements_i is the corresponding number of times that that result caused an improvement in the objective function. "1" is added so that at the very beginning, the various methods each have equal probability of being chosen and so that each method always has a chance of being chosen.

Figure 7:
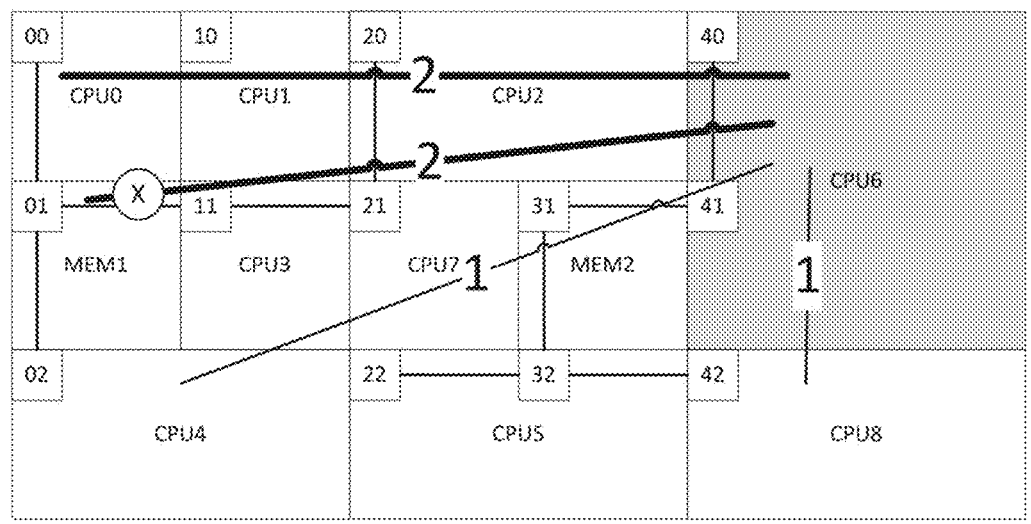
FIG. 7 illustrates the concept of "center of mass", in accordance with an example implementation.

Example implementations of position altering methods are described herein. Example implementations may utilize a concept termed herein as the "center of mass" for the traffic of a host. The "center of mass" is a position in the mesh indicative of an "average" of where that host's traffic is being sent. The "center of mass" can be computed by using a weighted average of the positions of all destination hosts the given host communicates with. The weight of a destination host in this "average" corresponds to the amount of traffic that is sent to the destination host. FIG. 7 shows an example of the center of mass for CPU6 in the previous example network, in accordance with an example implementation. In this example, CPU6 communicates with CPU0, MEM1, CPU4 and CPU8, and the relative traffic to each destination is 2, 2, 1 and 1 respectively. The center of mass of these destinations is shown as an X inside a circle. It is positioned in the second row as half the traffic is to destinations above this row and half is to destinations below this row. The center of mass is within the first column, as almost all destinations are within this column, and there is not enough traffic outside it to move the center outside. Arithmetically, the x position of the center of mass is computed by $$\frac{CPU0_x * CPU0_{bw} + MEM1_x + MEM1_{bw} + \ldots}{\text{total bandwidth}} = \frac{0*2 + 0*2 + 0*1 + 4*1}{2+2+1+1} = 2/3$$

and the y position of the center of mass is computed by $$\frac{CPU0_y * CPU0_{bw} + MEM1_y + MEM1_{bw} + \ldots}{\text{total bandwidth}} = \frac{0*2 + 1*2 + 2*1 + 2*1}{2+2+1+1} = 1$$

Figure 5A:
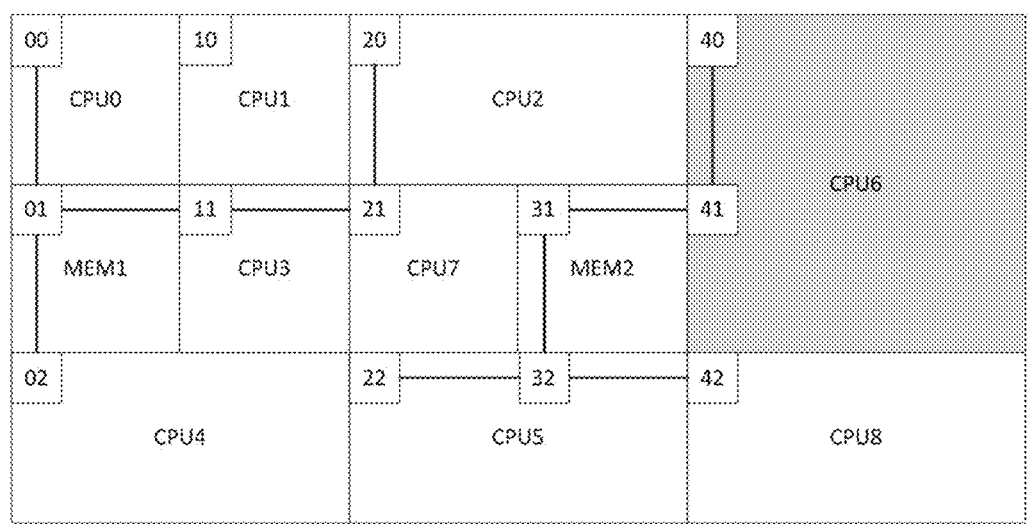
FIG. 5(a) illustrates a different configuration of system components with shaded host being the focus of the rearrangement.
Figure 5B:
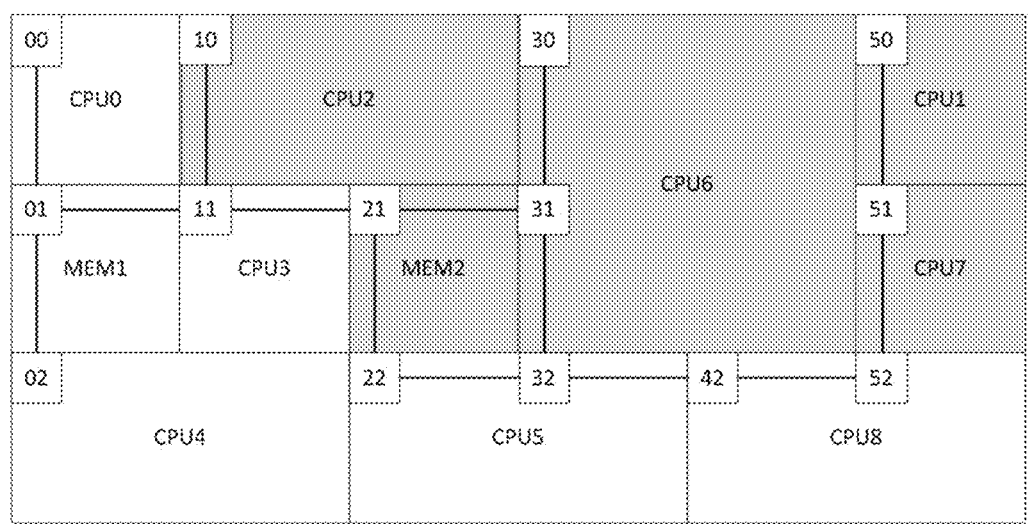
FIG. 5(b) shows one rearrangement of these components produced by a sliding rotation with shading indicating all hosts affected by rearrangement, in accordance with an example implementation.

In another example implementation, a position altering method may use a sliding rotation to adjust the position of a group of hosts. This operation starts by sliding one host one position in a direction and resolves any overlap caused by sliding overlapped hosts in the same direction. In FIG. 5(a), sliding rotation may be conducted for CPU2 one position left, whereupon CPU1 would be able to fill the newly opened position 30 and CPU2 ends at position 10. Alternately, a sliding rotation for CPU6 moving left results in CPU2 and MEM2 moving left, then CPU1 and CPU7 moving to the far right, and finally finishing the sliding rotation by resolving the final overlaps. The resulting final positions of the hosts using this sliding rotation are shown in FIG. 5(b).

Figure 6:
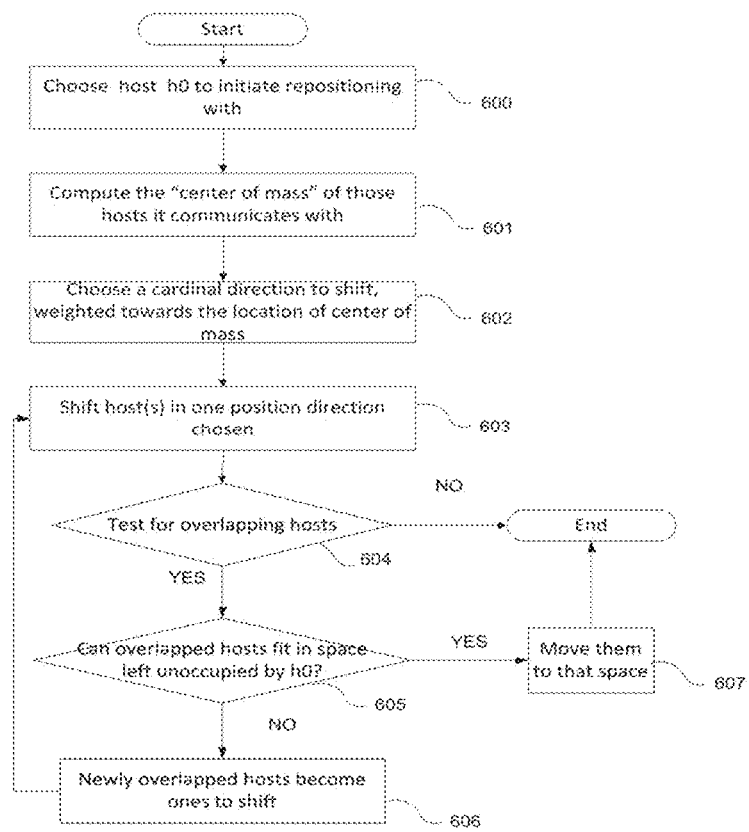
FIG. 6 shows a flowchart of the sliding rotation process, in accordance with an example implementation.

FIG. 6 describes a flowchart for the sliding rotation procedure, in accordance with an example implementation. At 600, a host is chosen to initiate repositioning, denoted by h0. At 601, the center of mass is computed for that host. At 602, a random function is utilized to choose a direction to shift, with higher probability for directions towards the center of mass. At 603, h0 is shifted one position in the chosen direction. At 604, a check is performed for overlaps; if there were no overlaps created by this shift (NO), then the flow ends. If there are overlaps (YES), then the flow proceeds to 605, where a check is performed to see if the newly overlapped hosts (not including what was just moved) can fit in the space left unoccupied when h0 was shifted. If the newly overlapped hosts will fit (YES), then the hosts are moved into that space and the flow ends. If not (NO), then the flow proceeds to 606, where the newly overlapped hosts become the hosts to move, and then the flow returns to 603. For torus NoCs, care must be taken to not get stuck in an infinite loop. For mesh NoCs, the algorithm should abort if a host is moved off the edge of the mesh.

Figure 5C:
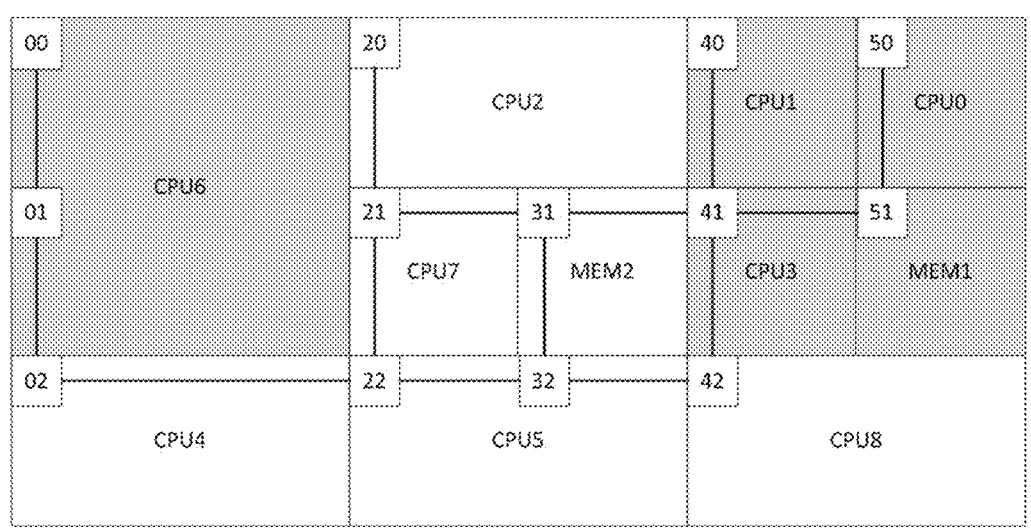
FIG. 5(c) shows one rearrangement of these components produced by a reflection, in accordance with an example implementation.

Another example implementation of position altering method may use a reflection swap to modify the position of hosts in the mesh. This method is based on a reflection which is performed across one face of a large host. The position of the host to be moved and the position of the hosts on the opposite side of the boundary are exchanged, so that the relative positions of moved hosts are maintained. Using FIG. 5(a) as starting point, the method might reflect across the east edge of CPU6. The result of this transformation is shown as FIG. 5(c). The relative positions of these hosts are maintained, but their positions relative to the rest of the network are changed.

Figure 8:
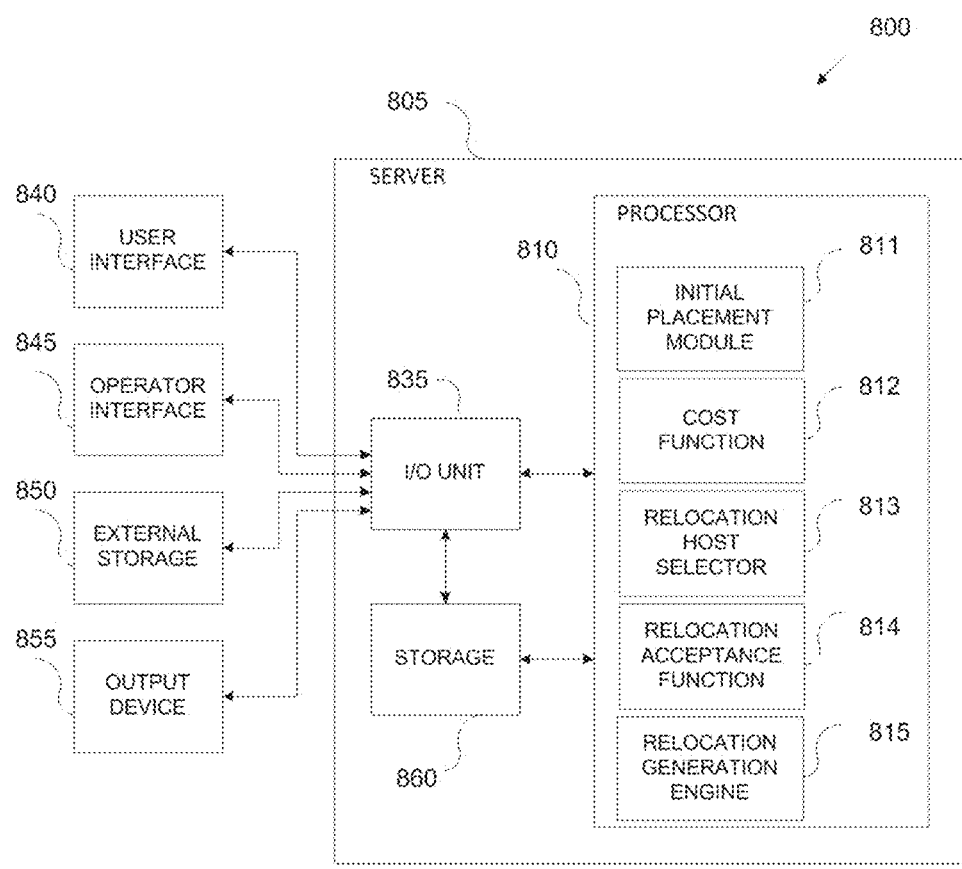
FIG. 8 illustrates a computer/server block diagram upon which the example implementations described herein may be implemented.

FIG. 8 illustrates an example computer system 800 on which example implementations may be implemented. The computer system 800 includes a server 805 which may involve an I/O unit 835, storage 860, and a processor 810 operable to execute one or more units as known to one of skill in the art. The term "computer-readable medium" as used herein refers to any medium that participates in providing instructions to processor 810 for execution, which may come in the form of computer-readable storage mediums, such as, but not limited to optical disks, magnetic disks, read-only memories, random access memories, solid state devices and drives, or any other types of tangible media suitable for storing electronic information, or computer-readable signal mediums, which can include transitory media such as carrier waves. The I/O unit processes input from user interfaces 840 and operator interfaces 845 which may utilize input devices such as a keyboard, mouse, touch device, or verbal command.

The server 805 may also be connected to an external storage 850, which can contain removable storage such as a portable hard drive, optical media (CD or DVD), disk media or any other medium from which a computer can read executable code. The server may also be connected an output device 855, such as a display to output data and other information to a user, as well as request additional information from a user. The connections from the server 805 to the user interface 840, the operator interface 845, the external storage 850, and the output device 855 may via wireless protocols, such as the 802.11 standards, Bluetooth® or cellular protocols, or via physical transmission media, such as cables or fiber optics. The output device 855 may therefore further act as an input device for interacting with a user.

The processor 810 may execute one or more modules. The initial placement module 811 may be configured to place the hosts at some initial positions in the 2D plane that avoids any host overlaps, and also ensures that the required connectivity is satisfied. The cost function module 812 devises a cost function based on the host positions in the NoC topology, routes taken by various transactions, the hosts inter-communication bandwidth and latency specification, and the desired performance metrics such as structural latency, interconnect area and power, etc. The relocation host selector module 813 may be configured to select various hosts that are examined for relocation to new positions, and the corresponding new positions. The relocation acceptance function module 814 decides whether a relocation decision from the relocation host selector module is accepted or rejected based on the feedback from the cost function module that determines the cost of the new host positions. The relocation generation engine module 815 determines which method to reorganize the host positions should be used and the computes the final positions of all hosts based on their current position and the relocation technique chosen.

Furthermore, some portions of the detailed description are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the example implementations, the steps carried out require physical manipulations of tangible quantities for achieving a tangible result.

Moreover, other implementations of the present application will be apparent to those skilled in the art from consideration of the specification and practice of the example implementations disclosed herein. Various aspects and/or components of the described example implementations may be used singly or in any combination. It is intended that the specification and examples be considered as examples, with a true scope and spirit of the application being indicated by the following claims.

What is claimed is:

1. A method, comprising:
generating a floorplan for a chip comprising a plurality of hosts and a network on chip (NoC) interconnect configured to communicatively connect the plurality of hosts, the generating of the floorplan comprising determining, by a processor, positions for the plurality of hosts, a first one of the plurality of hosts having a different physical footprint from a second one of the plurality of hosts, wherein the positions for the plurality of hosts are determined based on optimization of one or more efficiency functions; and
generating the NoC interconnect based on the positions for the plurality of hosts;
wherein the generating the NoC interconnect comprises connecting each of the plurality of hosts to an adjacent router based on the determined positions for the plurality of hosts.

2. The method of claim 1, wherein the one or more efficiency functions comprises at least one of: latency, bandwidth, and number of router hops between each host in the NoC interconnect.

3. The method of claim 1, further comprising determining whether resulting positions of the plurality of hosts results in overlap and repositioning overlapped ones of the plurality of hosts.

4. The method of claim 3, wherein the repositioning overlapped ones of the plurality of hosts comprises:
determining whether resulting positions of the plurality of hosts results in overlap, and repositioning overlapped ones of the plurality of hosts by one of: repositioning overlapped ones to the position associated with the selected host, and selecting the overlapped ones for shifting in the selected direction.

5. The method of claim 1, wherein the determining positions for the plurality of hosts is based on connectivity requirements of the plurality of hosts.

6. A non-transitory computer readable medium, storing instructions for executing a process, the instructions comprising:
generating a floorplan for a chip comprising a plurality of hosts and a network on chip (NoC) interconnect configured to communicatively connect the plurality of hosts, the generating of the floorplan comprising determining positions for the plurality of hosts, a first one of the plurality of hosts having a different physical footprint from a second one of the plurality of hosts, wherein the positions for the plurality of hosts are determined based on optimization of one or more efficiency functions; and
generating the NoC interconnect based on the positions for the plurality of hosts;
wherein the generating the NoC interconnect comprises connecting each of the plurality of hosts to an adjacent router based on the determined positions for the plurality of hosts.

7. The non-transitory computer readable medium of claim 6, wherein the one or more efficiency functions comprises at least one of: latency, bandwidth, and number of router hops between each host in the NoC interconnect.

8. The non-transitory computer readable medium of claim 6, wherein the instructions further comprise determining whether resulting positions of the plurality of hosts results in overlap and repositioning overlapped ones of the plurality of hosts.

9. The non-transitory computer readable medium of claim 8, wherein the repositioning overlapped ones of the plurality of hosts comprises:
determining whether resulting positions of the plurality of hosts results in overlap, and repositioning overlapped ones of the plurality of hosts by one of: repositioning overlapped ones to the position associated with the selected host, and selecting the overlapped ones for shifting in the selected direction.

10. The non-transitory computer readable medium of claim 6, wherein the determining positions for the plurality of hosts is based on connectivity requirements of the plurality of hosts.

11. A system, comprising:
a memory; and
a processor, configured to:
generate a floorplan for a chip comprising a plurality of hosts and a network on chip (NoC) interconnect configured to communicatively connect the plurality of hosts, the processor configured to generate the floorplan by determining positions for the plurality of hosts, wherein a first one of the plurality of hosts having a different physical footprint from a second one of the plurality of hosts, wherein the positions for the plurality of hosts are determined based on optimization of one or more efficiency functions; and
generate the NoC interconnect based on the positions for the plurality of hosts;
wherein the processor is configured to generate the NoC interconnect by connecting each of the plurality of hosts to an adjacent router based on the determined positions for the plurality of hosts.

12. The system of claim 11, wherein the one or more efficiency functions comprises at least one of: latency, bandwidth, and number of router hops between each host in the NoC interconnect.

13. The system of claim 11, wherein the processor is configured to determine whether resulting positions of the plurality of hosts results in overlap and reposition overlapped ones of the plurality of hosts.

14. The system of claim 11, wherein the processor is configured to reposition overlapped ones of the plurality of hosts by:
determining whether resulting positions of the plurality of hosts results in overlap, and repositioning overlapped ones of the plurality of hosts by one of: repositioning overlapped ones to the position associated with the selected host, and selecting the overlapped ones for shifting in the selected direction.

15. The system of claim 11, wherein the processor is configured to determine positions for the plurality of hosts based on connectivity requirements of the plurality of hosts.

* * * * *